United States Patent
Edler

(10) Patent No.: US 8,491,233 B2
(45) Date of Patent: Jul. 23, 2013

(54) CUTTING INSERT KIT, METHOD FOR MANUFACTURING CUTTING INSERTS AND A CUTTING INSERT FOR A CUTTING INSERT KIT

(75) Inventor: Daniel Edler, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 900 days.

(21) Appl. No.: 12/630,987

(22) Filed: Dec. 4, 2009

(65) Prior Publication Data
US 2010/0150672 A1 Jun. 17, 2010

(30) Foreign Application Priority Data
Dec. 16, 2008 (SE) ...................................... 0850144

(51) Int. Cl.
*B23B 27/00* (2006.01)
*B23C 5/00* (2006.01)

(52) U.S. Cl.
USPC .......................................... 407/113; 407/120

(58) Field of Classification Search
USPC ........................... 407/113, 114, 115, 116, 120
See application file for complete search history.

(56) References Cited

U.S. PATENT DOCUMENTS

| 7,341,433 | B2 * | 3/2008 | Berger et al. ................. 417/113 |
| 2004/0250423 | A1 | 12/2004 | Yu |
| 2007/0065240 | A1 | 3/2007 | Berger et al. |

FOREIGN PATENT DOCUMENTS

| CN | 2744494 Y | 12/2005 |
| CN | 201095117 Y | 8/2008 |
| DE | 750 725 | 1/1945 |
| JP | 57-43903 | 3/1982 |
| JP | 6-154431 | 6/1994 |
| JP | 2006-26793 | 2/2006 |
| JP | 2009-66715 | 4/2009 |
| JP | 2009-107088 | 5/2009 |

OTHER PUBLICATIONS

European Search Report for Application No. 09833714, dated Apr. 24, 2012.
Notification of the First Office Action for Chinese Application No. 200980150905.4, dated Jan. 6, 2013.

* cited by examiner

*Primary Examiner* — Will Fridie, Jr.
(74) *Attorney, Agent, or Firm* — Morgan, Lewis & Bockius LLP

(57) ABSTRACT

A cutting insert kit, including a base part formed of a brittle and wear-resistant material, and a plurality of cutting insert blanks integrally formed with the base part, which are separable one by one from the base part via indications of fracture. Each insert blank includes a front end portion, a rear end portion, an upper side, an under side, and at least one cutting edge in the front end portion formed between a clearance surface and one of the upper and under sides. The base part is common to all cutting insert blanks and to which each cutting insert blank is united to the base part via an indication of fracture in the form of a weakened connection member between the base part and the rear end portion of the cutting insert blank.

16 Claims, 3 Drawing Sheets

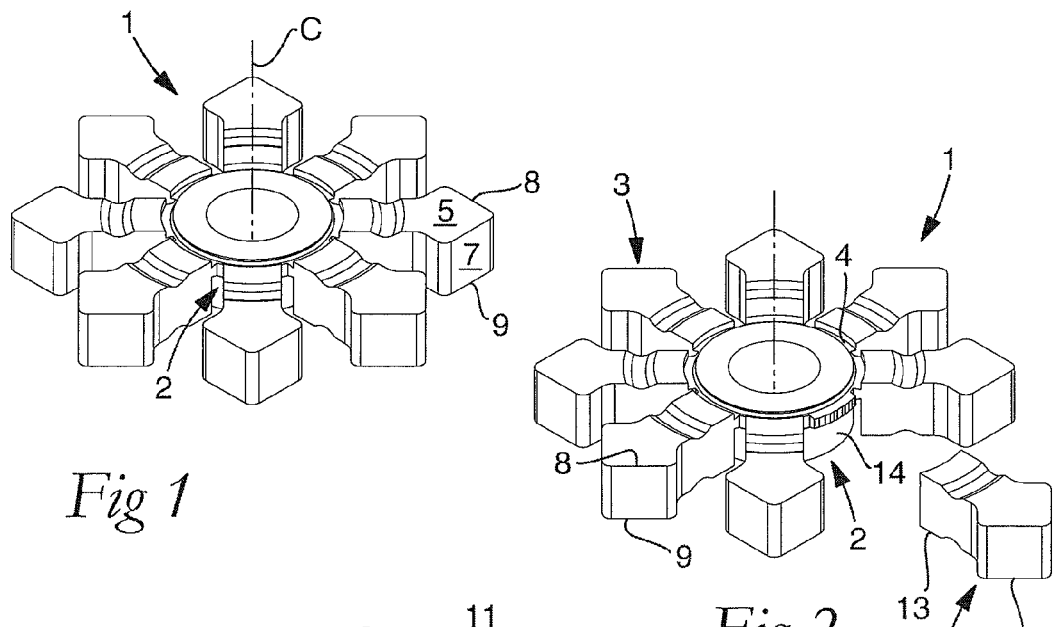
Fig 1
Fig 2
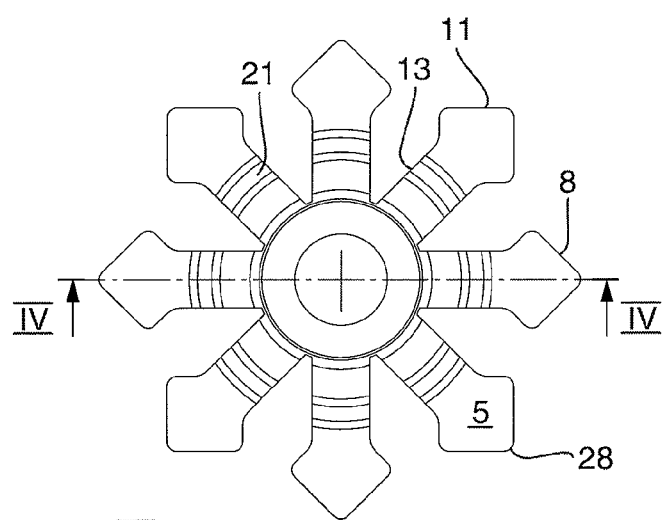
Fig 3
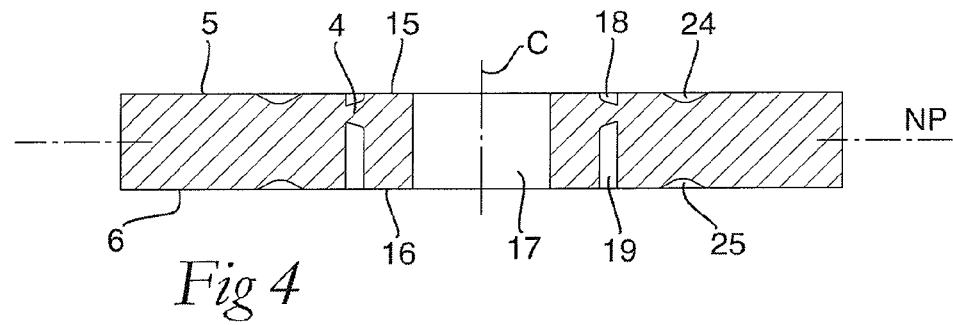
Fig 4

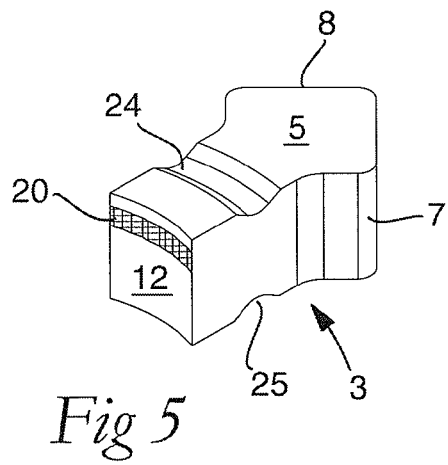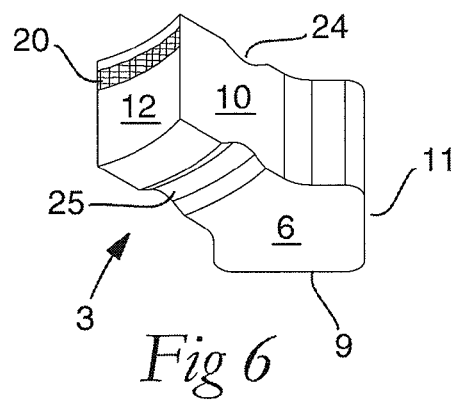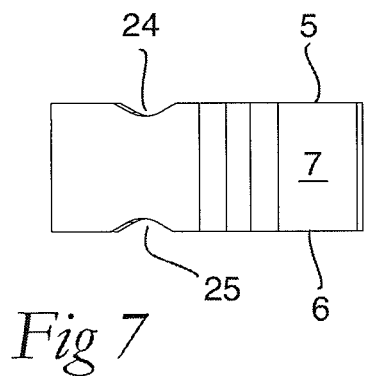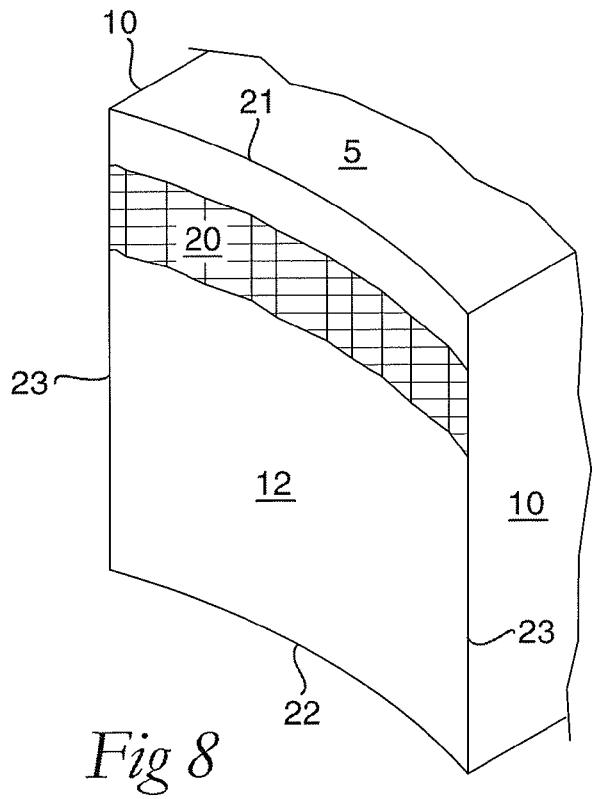

CUTTING INSERT KIT, METHOD FOR MANUFACTURING CUTTING INSERTS AND A CUTTING INSERT FOR A CUTTING INSERT KIT

This application claims priority under 35 U.S.C. §119 to Swedish Patent Application No. 0850144-7, filed on Dec. 16, 2008, which is incorporated by reference herein in its entirety.

FIELD OF THE INVENTION

The present invention relates generally to a cutting insert kit in the form of a body that is integrally manufactured from a brittle and wear-resistant material and includes a plurality of individual cutting insert blanks, which are separable one by one from the kit via indications of fracture, and individually include front and rear end portions, as well as upper and under sides, at least one cutting edge located in the front end portion being formed between a clearance surface and one of the upper and under sides. The invention also relates generally to a method for the manufacture of cutting inserts, and to a cutting insert as such separated from the kit.

BACKGROUND OF THE INVENTION

By U.S. Patent Application Publication No. 2007/0065240 A1, a united kit of a plurality of cutting inserts or cutting insert blanks is previously known, which can be separated one by one from the kit via indications of fracture. More precisely, the kit has the form of a magazine formed of a plurality of cutting inserts that are arranged in a row one after the other and can be fed forward one after the other into an active position in a tool body in the form of a boring bar, and that, after having been consumed by chip removing machining, are separated by breaking a weak connection member in order to, in such a way, give room for a trailing, unused cutting insert. This cutting insert kit is, however, associated with a plurality of disadvantages and limitations as a consequence of the fact that the different cutting inserts are interconnected, more precisely via connection members, which connect the rear end of each front cutting insert with the front end of a cutting insert being behind. In doing so, the connection member is located along the under sides of the cutting inserts, while the requisite cutting edge is formed in the transition between the upper side and a front clearance surface. Because the cutting edge has to be formed in the same front end that, via the connection member, connects the cutting insert to each cutting insert being in front, the latitude of the designer is significantly limited to construct the part of the active cutting insert that protrudes from the tool body, in different designs and with different cutting geometries. For instance, manufacture of double-sided cutting inserts is made impossible, i.e., cutting inserts that include operable cutting edges along the upper side as well as the under side. Also, the manufacture is limited to positive cutting inserts, i.e., cutting inserts the cutting edge angle of which between the chip surface and the clearance surface is acute, because otherwise, the remains of the broken-off connection member would interfere with the clearance of the cutting insert from the generated surface in the workpiece.

A cutting insert kit of the initially generally mentioned kind is furthermore known by DE 750725. However, also in this case, the cutting insert blanks included in the kit are mutually connected.

The present invention aims at obviating the above-mentioned disadvantages and limitations of the known cutting insert kit and at providing an improved cutting insert kit.

An object of the invention to provide a cutting insert kit, which offers the designer a great latitude to give the included cutting insert blanks most varying shapes. Among other things, it should be possible to form the individual insert blank with at least two useful cutting edges. In addition, it should be possible to manufacture the cutting insert kit by conventional pressing and sintering techniques, which allow at least the upper side and preferably also the under side to be formed with chip breakers or other formations included in topographically sophisticated chip surfaces.

Another object of the invention is to provide a cutting insert kit, which can be realized not only with identical cutting insert blanks but also with cutting insert blanks that are disparate, e.g., in respect of cutting geometries, corner radii, etc.

Yet another object of the invention is to provide a compact cutting insert kit that can be transported, stored and handled in a simple and convenient way.

Still another object of the invention is to provide a cutting insert kit, the indications of fracture of which result in minimal and harmless remains on the separated cutting insert.

Still another object of the invention is to provide a cutting insert kit, which in connection with the manufacture can be formed with a reliable and exact clamping of the separated cutting insert in the appurtenant tool holder, e.g., a boring bar.

Still another object of the invention is to provide a cutting insert kit from which double-sided, i.e., multi-edge, cutting inserts should be separable, which simplifies the work to invert the cutting insert and change the cutting edge, more precisely in such a way that the user in a structured way should be able to keep track of which cutting edge is unused.

SUMMARY OF THE INVENTION

In an embodiment, the invention provides a cutting insert kit, including a base part formed of a brittle and wear-resistant material, and a plurality of cutting insert blanks integrally formed with the base part, which are separable one by one from the base part via indications of fracture. Each insert blank includes a front end portion, a rear end portion, an upper side, an under side, and at least one cutting edge in the front end portion formed between a clearance surface and one of the upper and under sides. The base part is common to all cutting insert blanks and to which each cutting insert blank is united to the base part via an indication of fracture in the form of a weakened connection member between the base part and the rear end portion of the cutting insert blank.

In another embodiment, the invention provides a method of manufacturing cutting inserts for chip removing machining, including forming a base part of a brittle and wear-resistant material, forming a plurality of cutting insert blanks integrally with the base part, which are separable one by one from the base part via indications of fracture, forming each insert blank to include a front end portion, a rear end portion, an upper side, an under side, and at least one cutting edge in the front end portion formed between a clearance surface and one of the upper and under sides, forming the base part common to all cutting insert blanks such that each cutting insert blank is united to the base part via an indication of fracture in the form of a weakened connection member between the base part and the rear end portion of the cutting insert blank, and separating at least one cutting insert from the base part by fracturing the weakened connection member.

In yet another embodiment, the invention provides a cutting insert for chip removing machining, including a front end portion, a rear end portion, an upper side, an under side, and at least one cutting edge in the front end portion formed between a clearance surface and one of the upper and under sides. A fracture surface, provided by separation of the cutting insert from a cutting insert kit, is only present in the rear end portion of the cutting insert.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

FIG. 1 is a top side view of a cutting insert kit according to an embodiment of the invention;

FIG. 2 is an analogous perspective view showing the kit and a separated cutting insert;

FIG. 3 is a planar view from above of the same kit;

FIG. 4 is a enlarged longitudinal section IV-IV in FIG. 3

FIG. 5 is an enlarged perspective view illustrating a separated cutting insert as viewed obliquely from above;

FIG. 6 is a perspective view showing the same cutting insert from the under side;

FIG. 7 is a side view of the cutting insert according to FIGS. 5 and 6;

FIG. 8 is an enlarged, sectioned perspective view of the rear end of the separated cutting insert;

DETAILED DESCRIPTION OF THE PREFERRED EMBODIMENTS

Figure 9:
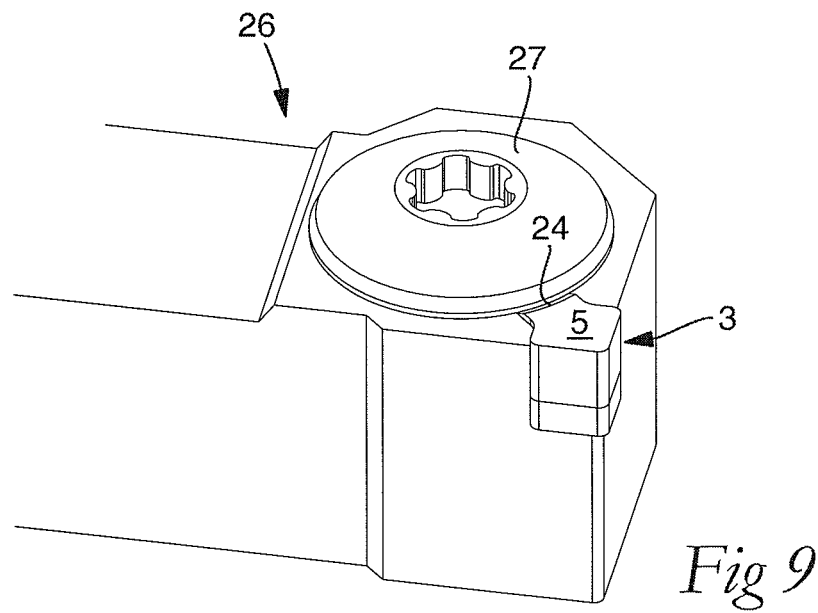
FIG. 9 is a partial perspective view showing the cutting insert clamped in a tool holder.

Before the different embodiments are described in more detail, it should be emphasized that the drawing figures are schematic and therefore do not illustrate all details of the final products. For example, the chip surfaces of the cutting insert blanks serving as upper and under sides are shown in the form of neutral, plane surfaces neither with chip breakers nor with other formations of the type that usually is included in the final cutting insert products.

In FIGS. 1-4, numeral 1 generally designates a kit, which in accordance with the embodiment includes a base part 2, as well as a plurality of cutting insert blanks 3, each one of which is united to the base part 2 via an indication of fracture 4. Each one of the cutting insert blanks 3 includes an upper side 5 as well as an under side 6, which in the example are shown in the form of plane and mutually parallel surfaces. Between these surfaces 5, 6, an imaginary neutral plane NP is shown, which is parallel to the surfaces 5, 6 and extends perpendicularly to a center axis C. In accordance with traditional technique for the manufacture of hard products for cutting machining, the kit can be produced by pressing and sintering a powder mass of the type that has the ability of forming a hard, brittle, and wear-resistant material, e.g., cemented carbide. The pressing can be carried out by the fact that two opposite mould dies are brought axially to and from each other parallel to the center axis C while forming a so-called green ware, which during the subsequent sintering shrinks approx. 18% and results in an exceptionally hard body having smooth surfaces. In each cutting insert blank (and the separated cutting insert according to FIGS. 5-8), there are included, on one hand, a first cutting edge 8 in the transition between the upper side 5 and a clearance surface 7, and, on the other hand, a second cutting edge 9 in the transition between the clearance surface 7 and the under side 6. More precisely, the cutting edges 8, 9 and the clearance surface 7 are included in a front end portion 11, which in this case has a polygonal contour shape and transforms into a rear end portion 13, which in addition to the surfaces 5, 6 is delimited by two opposite side surfaces 10 and a rear end surface 12. The different cutting insert blanks are united with the common base part 2 via an indication of fracture each in the form of a weakened connection member 4 (see FIG. 4), which is spaced apart from the cutting edges of the individual blank, more precisely by being included in the rear end portion 13.

In the following description, the reference designation 3 is used not only for the cutting insert blank integrated in the kit, but also for the broken-away cutting insert, which is shown in FIGS. 5-8.

In the shown embodiment, the base part 2 is in the form of a hub-like, central part from the peripheral portion of which the cutting insert blanks protrude. In this case, the base part 2 includes an envelope surface 14 that is rotationally symmetrical shaped in relation to the axis C and from which the cutting insert blanks 3 protrude radially via the connection members 4. In the example, the envelope surface 14 has a cylindrical shape, the upper and under sides 15, 16 of the base part being plane and situated flush with the upper and under sides 5, 6 of the cutting insert blanks. Furthermore, a central hole 17 is recessed in the base part 2, which gives the base part the shape of a ring and therefore in an advantageous way reduces the weight and material consumption of the base part to a minimum.

Figure 11:
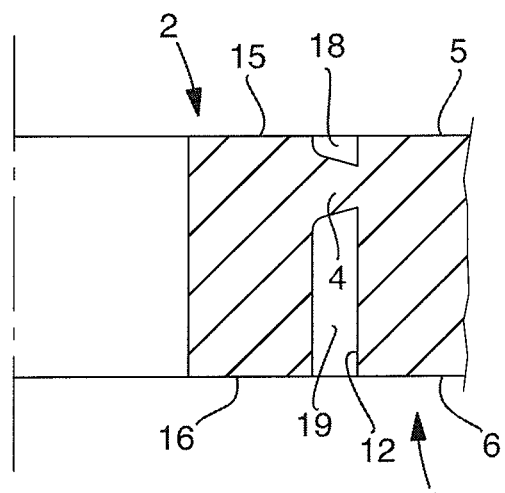
FIG. 11 is an enlarged detailed section illustrating an embodiment of a connection member between the base part of the kit and an individual cutting insert blank.

In the embodiment shown, the connection members 4 are provided by pressing in ring-shaped grooves 18, 19 in the upper and under sides of the green ware formed by a powder mass (see FIGS. 4 and 11). The upper groove 18 is shallower than the lower groove 19. As is seen in FIG. 11, the two grooves 18, 19 are formed in such a way that the material portion, which is left between the grooves and which forms the connection member 4 between the cutting insert blank 3 and the base part 2, obtains a cross-sectionally tapering shape. More precisely, the connection member 4 tapers toward the rear end surface 12 of the cutting insert blank 3. This means that the connection member becomes weakest adjacent to the rear end surface, whereby the connection member will be broken off in the immediate vicinity of the rear end surface, when the cutting insert blank is separated from the base part. The result will be that the remains of each connection member of the separated cutting insert become minimal and harmless, and manifest themselves in the best case only in that the rear end surface of the broken-away cutting insert has a rough surface field 20 (see FIGS. 5 and 8). It should also be mentioned that the deepest groove 19 advantageously can be utilized for the receipt of a tool (e.g., a screwdriver), by which the separation of the individual cutting insert blank 3 from the base part 2 is carried out.

With particular reference to FIG. 8, it should be pointed out that the rear end surface 12 of the separated cutting insert in this case is concave and delimited by four borderlines, viz., on one hand, upper and lower borderlines 21, 22 in the transitions to the upper and under sides 5, 6 of the cutting insert, and, on the other hand, two side borderlines 23 in the transitions to the two side surfaces 10 along the rear end portion 13 of the cutting insert. In the example, these side surfaces 10 are plane and mutually parallel while delimiting a rear end portion, which generally is more slender than the front end portion 11, viz. so far that the rear end portion has a (uniform) width that is smaller than the greatest width of the front end portion. Because the previously mentioned upper groove 18 is considerably shallower than the lower groove 19, the fracture surface 20 that is left after breaking off the cutting insert will be located considerably closer to the upper borderline 21 of the end surface 12 than the lower one 22.

As best seen in FIG. 3, in this case, those front end portions 11 of the cutting insert blanks in which the cutting edges 8, 9 are included have one and the same shape. In the example, the contour shape of the front part 11 is polygonal, more precisely quadratic, two straight cutting edges meeting each other in a rounded nose edge 28. In the example, the separated cutting inserts are conceived for turning purposes.

From FIGS. 3 and 4, it is furthermore seen that radially outside the grooves 18, 19, an additional pair of grooves 24, 25 are countersunk, which however are considerably shallower than at least the deepest groove 19. Advantageously, the grooves 24, 25 are arched like the grooves 18, 19. As is seen from FIG. 9, each one of these grooves 24, 25 may, after separation of a usable cutting insert 3, be utilized for fixation of the cutting insert in a holder 26, which in this case is in the form of a turning holder. More precisely, the peripheral part of a tightening screw or clamp 27 can be brought into engagement with the, at the moment, upwardly turned groove 24 in the cutting insert 3. In this connection, it should be emphasized that the presence of grooves 24, 25 in the upper side as well as the under side of the cutting insert allows inversion and clamping of the cutting insert so that both cutting edges 8, 9 can be utilized.

By uniting, in accordance with the invention, the individual cutting insert blanks to a common base part, the requisite indication of fracture can be formed adjacent to a rear end of the cutting insert blank, while the sensitive cutting edge or edges can be formed in a front end without being interfered by the remains of the indications of fracture. Furthermore, it should be pointed out that the invention, in contrast to the cutting insert kit according to U.S. Patent Application Publication No. 2007/0065240 A1, is based on the idea of separating the individual cutting insert before use, while the known kit is based on the idea of separating the cutting insert after consumption. In other words, the invention offers latitude to apply the separated cutting inserts to most varying types of holders. Furthermore, in one and the same kit, cutting insert blanks can be formed with different shape, e.g., in respect of the geometry of the cutting edges and chip surfaces. The cutting insert kit is also advantageous in connection with the conventional manufacture of different details by chip removing machining by means of uniform cutting inserts, viz. so far that the kit—contrary to loose cutting inserts—forms a united and smoothly manageable unit having a plurality of cutting inserts. The invention offers a special advantage in connection with invertible, multi-edge cutting inserts of the type that is exemplified in the drawings, more precisely by the fact that the fraction surface along the rear end surface of the cutting insert can be utilized to keep track of which cutting edge is worn out and which is unused. Thus, the operator can by routine always mount the upper side positioned closest to the fraction surface of the cutting insert upward, when the cutting insert firstly is applied in a tool. When the cutting insert is thereafter inverted with the purpose of utilizing the other cutting edge, it can simply be observed whether the mounting becomes correct, viz. by ensuring that the upper side and the fraction surface are turned downward.

Figure 10:
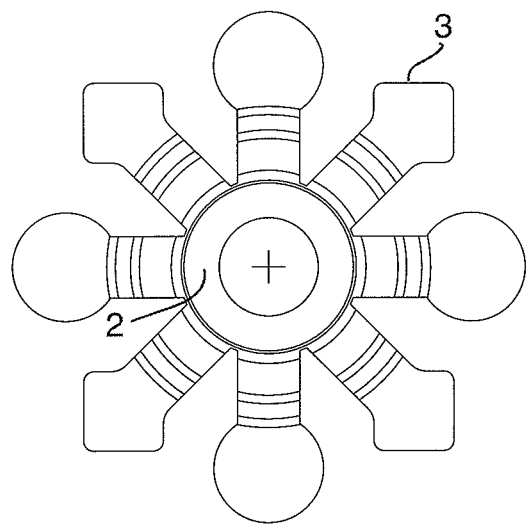
FIG. 10 is a planar view of an alternative embodiment of the kit according to the invention.

In FIG. 10, it is schematically illustrated how the shape of the cutting insert blanks included in the kit may vary, for instance so far that certain cutting edges have a polygonal contour shape, while other ones have a circular contour shape.

The invention is not limited only to the embodiments described above and shown in the drawings. Thus, the basic shape of the base part as well as the different cutting insert blanks may vary most considerably, provided that the connection member serving as an indication of fracture is placed at the rear end of the cutting insert blank or otherwise spaced apart from the cutting edge or edges of the blank. Furthermore, the front, free end portions in which the cutting edges are created, may be formed in miscellaneous ways. For instance, instead of double-sided cutting insert blanks, i.e., blanks having two cutting edges, single sided cutting insert blanks may be formed, having only one cutting edge, wherein the nominal clearance under the cutting edge may be positive. Within the scope of the invention, it is also feasible to form the base part in the form of a ring, from the inside of which the cutting insert blanks protrude in the direction inward toward the center of the ring. It is also feasible to form the kit with cutting insert blanks that protrude in the axial direction from the upper side and/or under side of the ring or base part. Neither does the base part need to have a rotationally symmetrical, pulley-like basic shape. Thus, the base part could have a polygonal basic shape with a number of peripheral, plane surfaces, which may be parallel to plane, rear end surfaces of the cutting insert blanks. Furthermore, the cutting inserts be may formed not only in the form of turning inserts of the type that has been exemplified in the drawings, but also for chip removing machining of metal of another type, in particular milling and drilling, respectively. In the example shown in the drawings, the connection members between the cutting insert blanks and the base part are weakened by having a thickness that is considerably smaller than the thickness of the cutting insert blanks, the fraction surface (see FIG. 8) of the broken-off cutting insert becoming thin in relation to the entire end surface of the cutting insert. In the example, the area of the fraction surface accordingly amounts to approx. ⅕ of the total area of the end surface, the fraction surface extending all the way between the two side borderlines of the end surface. Within the scope of the invention, it is feasible to vary the design of the individual connection member, provided that a weak connection is formed between the rear end surface of the cutting insert blank and the base part common to all cutting insert blanks. For instance, a thin connection member could be orientated vertically instead of horizontally. Furthermore, instead of one single connection member, two or more smaller members may be utilized. However, it is preferred that the members are given a tapering shape in the direction from the base part toward the individual cutting insert blank in order to locate the fracture surface in the immediate vicinity of the rear end surface of the broken-off cutting insert, such as has been shown in the drawings.

Furthermore, it should be mentioned that a variety of materials, from which the cutting insert kit is manufactured, are feasible within the scope of the invention. In addition to cemented carbide, which has been mentioned in the connection with the embodiments described above, for instance ceramics, cermet or the like may be used. Furthermore, it is also feasible to form a cutting insert kit according to the invention with cutting edge portions of a—in relation to cemented carbide—harder material, such as PCD (polycrystalline diamond) or CBN (cubic boron nitride). These cutting edge portions may, for instance, be a thin layer of the harder material, which is attached non-detachably, e.g., by soldering, to the cemented carbide of one or more cutting insert blanks included in a cutting insert kit.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A cutting insert kit, comprising:
a base part formed of a brittle and wear-resistant material; and
a plurality of cutting insert blanks integrally formed with the base part, which are separable one by one from the base part via indications of fracture, each insert blank including a front end portion, a rear end portion, an upper side, an under side, and at least one cutting edge in the front end portion formed between a clearance surface and one of the upper and under sides,
wherein the base part is common to all cutting insert blanks and to which each cutting insert blank is united to the base part via an indication of fracture in the form of a weakened connection member between the base part and the rear end portion of the cutting insert blank.

2. The cutting insert kit according to claim 1, wherein each cutting insert blank includes a first cutting edge in the transition between the clearance surface and the upper side, and a second cutting edge in the transition between the clearance surface and the under side.

3. The cutting insert kit according to claim 1, wherein the base part is a central part from the periphery of which the cutting insert blanks protrude and to which the connection members thereof are united.

4. The cutting insert kit according to claim 3, wherein the base part has a circumferential surface that is rotationally symmetrical shaped in relation to a central axis and from which the cutting insert blanks protrude radially via the connection members.

5. The cutting insert kit according to claim 1, wherein the base part comprises plane upper and under sides, which are situated flush with the upper and under sides of the cutting insert blanks.

6. The cutting insert kit according to claim 4, wherein a central hole is recessed in the base part and imparts the shape of a ring to the base part.

7. The cutting insert kit according to claim 3, wherein the connection members are provided by at least one groove which runs around the periphery of the base part and separates the base part from rear end surfaces of each one of the cutting insert blanks.

8. The cutting insert kit according to claim 7, wherein grooves are countersunk in the upper side as well as the under side of the body.

9. The cutting insert kit according to claim 8, wherein the groove in the under side is deeper than the groove in the upper side.

10. The cutting insert kit according to claim 1, wherein the connection member tapers in the direction from the base part toward the rear end surface of the cutting insert blank in order to be broken in a fracture surface in the immediate vicinity of the rear end surface of the cutting insert blank.

11. The cutting insert kit according to claim 1, wherein the front end portion of the cutting insert blank has a greatest width that is greater than the width of the rear end portion that is connected to the base part.

12. The cutting insert kit according to claim 1, wherein different cutting insert blanks are formed with disparate cutting geometries.

13. A method of manufacturing cutting inserts for chip removing machining, comprising:
forming a base part of a brittle and wear-resistant material;
forming a plurality of cutting insert blanks integrally with the base part, which are separable one by one from the base part via indications of fracture;
forming each insert blank to include a front end portion, a rear end portion, an upper side, an under side, and at least one cutting edge in the front end portion formed between a clearance surface and one of the upper and under sides;
forming the base part common to all cutting insert blanks such that each cutting insert blank is united to the base part only via an indication of fracture in the form of a weakened connection member between the base part and the rear end portion of the cutting insert blank; and
separating at least one cutting insert from the base part by fracturing the weakened connection member,
wherein a fracture surface, provided by separation of the cutting insert from the base part, is only present in the rear end portion of the cutting insert blank.

14. The cutting insert for chip removing machining, comprising:
a front end portion, a rear end portion, an upper side, an under side, and at least one cutting edge in the front end portion formed between a clearance surface and one of the upper and under sides;
wherein a fracture surface, provided by separation of the cutting insert from a cutting insert kit, is only present in the rear end portion of the cutting insert,
wherein the rear end portion of the cutting insert includes an end surface which extends between upper and lower borderlines and a pair of side borderlines,
wherein a first cutting edge is in the transition between the clearance surface and the upper side, and a second cutting edge is in the transition between the clearance surface and the under side, and
wherein the fracture surface is situated nearer one of the upper and lower borderlines than the other.

15. The cutting insert according to claim 14, wherein the fracture surface extends in the direction from one of the side borderlines toward the other.

16. The cutting insert according to claim 14, wherein the fracture surface is included in the end surface and has an area that is smaller than the total area of the end surface.

* * * * *